United States Patent [19]
Chiu et al.

[11] Patent Number: 5,575,563
[45] Date of Patent: Nov. 19, 1996

[54] MULTIUSAGE THERMOMETER

[76] Inventors: Job Chiu, No. 19, Kun-Ming St.;
Kai-Tang Chung, 3F., No. 104,
Kuang-Hui St., both of Chungli, Taiwan

[21] Appl. No.: 248,436

[22] Filed: May 24, 1994

Related U.S. Application Data

[63] Continuation-in-part of Ser. No. 92,132, Jul. 15, 1993, abandoned.

[51] Int. Cl.⁶ .............................. G01K 1/14; G01K 7/01; G01K 13/00
[52] U.S. Cl. ......................... 374/141; 374/157; 374/156; 374/150; 374/178; 374/208
[58] Field of Search ..................... 374/157, 208, 374/156, 150, 141, 178; 439/913; D7/643

[56] References Cited

U.S. PATENT DOCUMENTS

| | | | |
|---|---|---|---|
| D. 207,270 | 3/1967 | Benedetto | 374/157 |
| D. 217,879 | 6/1970 | Biolik | D7/643 |
| 856,768 | 6/1907 | Comins | 374/157 |
| 2,035,334 | 3/1936 | Monrad | 374/157 |
| 3,052,770 | 9/1962 | Di Vito | 439/913 |
| 3,229,242 | 1/1966 | Finney et al. | 439/913 |
| 3,535,770 | 10/1970 | Crandell et al. | 374/157 |
| 3,658,122 | 4/1972 | Kalyk | 374/150 |
| 3,695,110 | 10/1972 | Biolik | 374/157 |
| 4,305,639 | 12/1981 | Kolb | 439/913 |
| 4,454,370 | 6/1984 | Voznick | 374/208 |
| 4,841,274 | 6/1989 | Yagner, Jr. et al. | 374/208 |
| 4,842,419 | 6/1989 | Nietert | 374/208 |
| 5,024,622 | 6/1991 | Ide | 374/208 |

FOREIGN PATENT DOCUMENTS

| | | | |
|---|---|---|---|
| 0820809 | 11/1951 | Germany | 374/150 |
| 0511847 | 12/1958 | Italy | 374/150 |
| 60-192247 | 9/1985 | Japan | 374/208 |
| 61-142430 | 6/1986 | Japan | 374/208 |
| 0270178 | 5/1927 | United Kingdom | 374/156 |

OTHER PUBLICATIONS

"Craftemp–disposable thermometer" Sales Brochure, made by Crafton Medical AB, Lund, Sweden (Mar. 1980).
DT 0251733, published Dec. 1912 (only the drawings were considered).
JA 2-154125(A), published Jun. 1990 (only abstract considered).

Primary Examiner—Diego F. F. Gutierrez
Attorney, Agent, or Firm—Fay, Sharpe, Beall, Fagan, Minnich & McKee

[57] ABSTRACT

A multiusage thermometer comprises a body portion capable of selectively detachably engaging thereto at least a first sensing portion, a second sensing portion, a third sensing portion and a fourth sensing portion each of said sensing portions having a first engaging member at a first end thereof, said body portion integrally forming a second engaging member at one end thereof for electrically and complementarily connecting thereto said first engaging member of each of said sensing portions. This invention offers a thermometer being multiusable and having a body portion capable of being selectively detachably engaged with other sensing portions of various usages based on the situation one faces.

8 Claims, 11 Drawing Sheets

MULTIUSAGE THERMOMETER

The present invention is a continuation-in-part application of U.S. patent application Ser. No. 08/092,132, filed on Jul. 15, 1993, now abandoned.

FIELD OF THE INVENTION

Background of the Invention

Figure 1:
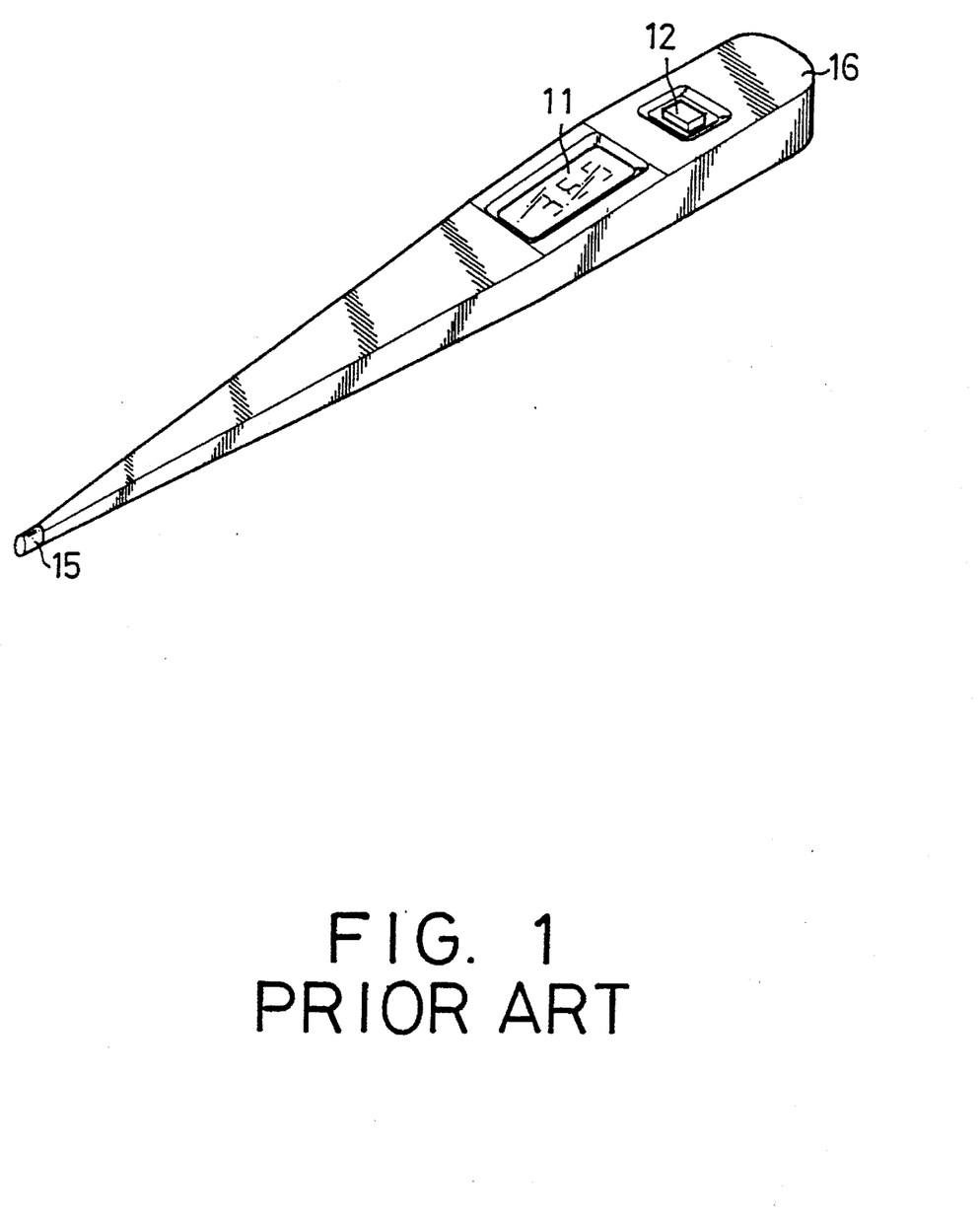
FIG. 1 is a perspective view for a conventional electronic thermometer.
Figure 2:
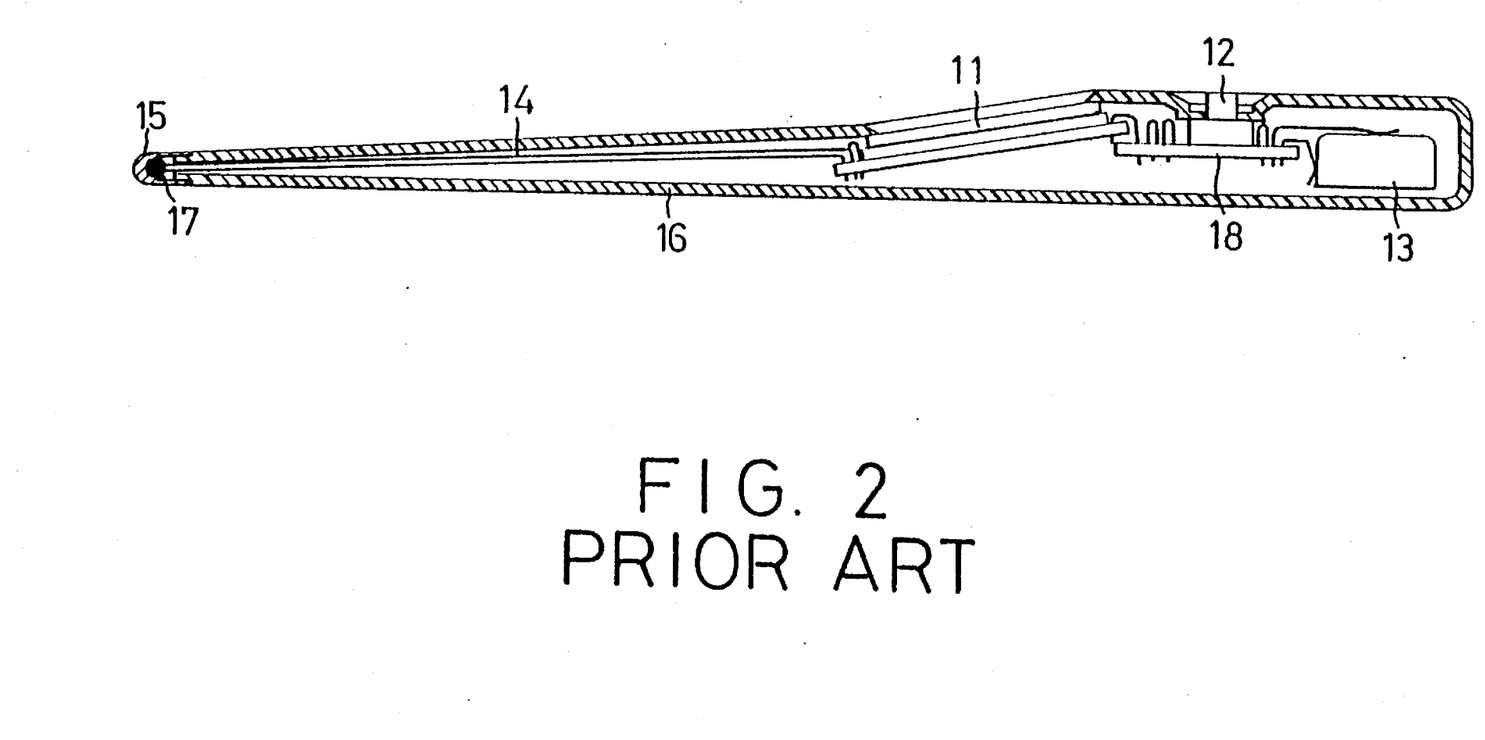
FIG. 2 is a sectional view of the conventional electronic thermometer of FIG. 1.

A conventional electronic thermometer as shown in FIGS. 1 and 2 is merely for measuring the body temperature. The electronic thermometer comprises a display screen 11, a power switch 12, a battery 13, a sensing cap 15, a temperature sensing diode 17, a pair of transmitting wires 14, a circuit board 18, and a shell 16 for configuring the above components together. The body temperature is sensed by the temperature sensing diode 17 via the sensing cap 15 thus incurring a voltage drop on the temperature sensing diode 17. The incurred voltage drop is then coupled on two transmitting wires 14, which in turn transmit the voltage drop to the circuit board 18 to be processed thereto, and thus a body temperature value is displayed on the display screen 11. The power switch 12 is operable to turn on/off the power supply for the circuit board and the display screen 11. Of course the power supply herein is a battery 13. In the prosecution of the parent application, there are cited U.S. Pat. No. 5,024,622 issued to Ide, U.S. Pat. No. 4,454,370 issued to Voznick, U.S. Pat. No. 3,535,770 issued to Crandell et al., and CRAFTEMP advertisements by the Examiner in two office Actions to reject the parent application. It is respectfully submitted, however, that the Ide patent aims to solve the problems that the connector surface sustains wear and a temperature display obtained from the main body of the thermometer becomes an erroneous display without reproducibility, as disclosed in Column 1, lines 19–28. The Voznick patent relates to an "industrial" portable thermocouple surface probe, is not stressed upon being detachable, and tries to minimize or avoid that attempts to place the protective shield close enough to the junction in order to provide an adequate physical protection adversely affect the precision temperature sensing and may require supplementary heater section to heat the shield, as disclosed in Column 1, lines 38–43. The Crandell et al. patent is armed to provide an "industrial" spoon in order to obviate disadvantages of slower response time and the requirement of a deeper fluid immersion level m the substance being measured, as disclosed in Column 1, lines 55–66, so that it is not much related to a detachable temperature responsive device. The CRAFTEMP discloses a disposable thermometer and therefore does not suggest a probe capable of being repetitively put into use. However, none of the conventional detachable/nondetachable thermometer is suitable for detecting temperatures of different objects, e.g., detecting a temperature of a food m a spoon, a person's body temperature or his/her tongue temperature, a temperature of milk in a milk bottle, and a temperature of a hot water in a bathing pool by the same thermometer. In a family having a baby, the parents have to take care of the baby from being scalded when feeding or bathing the baby. Furthermore, a baby is easy to get a sickness such as a fever. When he/she is sick, a thermometer has to be ready for being used to get a precise temperature reading from him/her. None of the prior thermometer is suitably applied to such various aspects of taking care of a baby unless all kinds of thermometers in the art were bought and prepared. It is really cost-ineffective for a family according to the prior art.

SUMMARY OF THE INVENTION

An object of the present invention is to provide a multiusage thermometer which has a body portion and several alternative tail portions which act as sensing portions and have various shapes and constructions for detecting temperatures of different objects under diverse situations.

Another object of the present invention is to offer people an inexpensive thermometer having various required functions and usages.

In accordance with the present invention, a multiusage thermometer comprises a body portion capable of selectively detachably engaging thereto at least one of a first sensing portion, a second sensing portion, a third sensing portion and a fourth sensing portion, each of the sensing portions having a first engaging member at a first end thereof, the body portion integrally forming a second engaging member at one end thereof for electrically and complementarily connecting thereto the first engaging member of each of the sensing portions.

In accordance with another aspect of the present invention, the first sensing portion is a tube structure having a sensing cap at a second end thereof for contacting with a first object to thus obtain a temperature of the object which is displayed on the body portion.

In accordance with another aspect of the present invention, the first sensing portion further comprises a temperature sensing diode electrically connected to the sensing cap for responding to the temperature of the first object and incurring a voltage drop thereacross representing a relative temperature of the first object.

In accordance with another aspect of the present invention, the second sensing portion is a spoon structure having a spoon at a second end thereof, a sensing cap being installed at a center of the spoon for contacting with contents in the spoon to thus obtain a temperature of the contents which is displayed on the body portion.

In accordance with another aspect of the present invention, the second sensing portion further comprises a temperature sensing diode electrically connected to the sensing cap for responding to contents in the spoon and incurring a voltage drop thereacross representing a relative temperature of the contents of the spoon.

In accordance with another aspect of the present invention, the first engaging member is a plug and the second engaging member is a corresponding socket.

In accordance with another aspect of the present invention, the third sensing portion is generally of a hollow annular structure having a sensing cap generally positioned at a geometric center of the annular structure for contacting with a second object to obtain a temperature of the second object.

In accordance with another aspect of the present invention, the third sensing portion is generally of a flying saucer structure having a sensing cap generally positioned at a geometric center of said saucer structure for contacting with an object to obtain a temperature of said object.

In accordance with another aspect of the present invention, the fourth sensing portion is generally of an circular tube structure having an interior therein for accommodating a container capable of filling therein contents, and has a sensing cap mounted on one side of the circular tube structure for contacting with the contents m the container to obtain a temperature of the contents.

The present invention may be best understood through the following description with reference to the accompanying drawings, in which:

DETAILED DESCRIPTION OF THE PREFERRED EMBODIMENT

Figure 3:
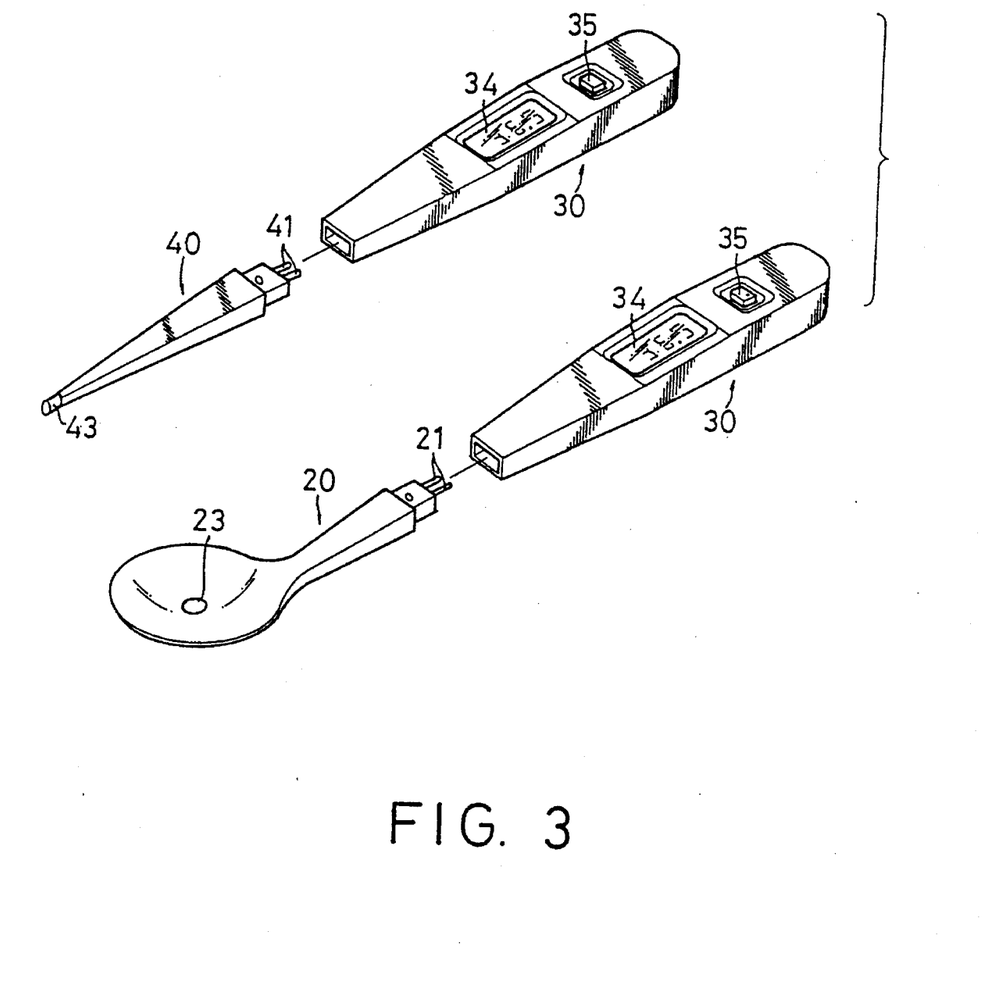
FIG. 3 is an exploded view of a multiusage thermometer in accordance with the present invention.

Referring to FIG. 3, a multiusage thermometer in accordance with the present invention comprises a body portion 30 and a sensing portion 20 (or 40). The body portion 30 includes a display screen 34 and a power switch 35. The sensing portion 20 (or 40) is constructed as a tube structure 40 or a spoon structure 20. The body portion 30 and the sensing portion 20 (or 40) are allowed to fix together to constitute a body thermometer (or spoon thermometer). The tube structure 40 has a sensing cap 43 at a first end thereof and a plug 41 at a second end thereof. The spoon structure 20 has a sensing cap 23 formed at one end thereof and a plug 21 formed at the other end thereof. The plug 21 and the plug 41 have an identical structure.

Figure 4:
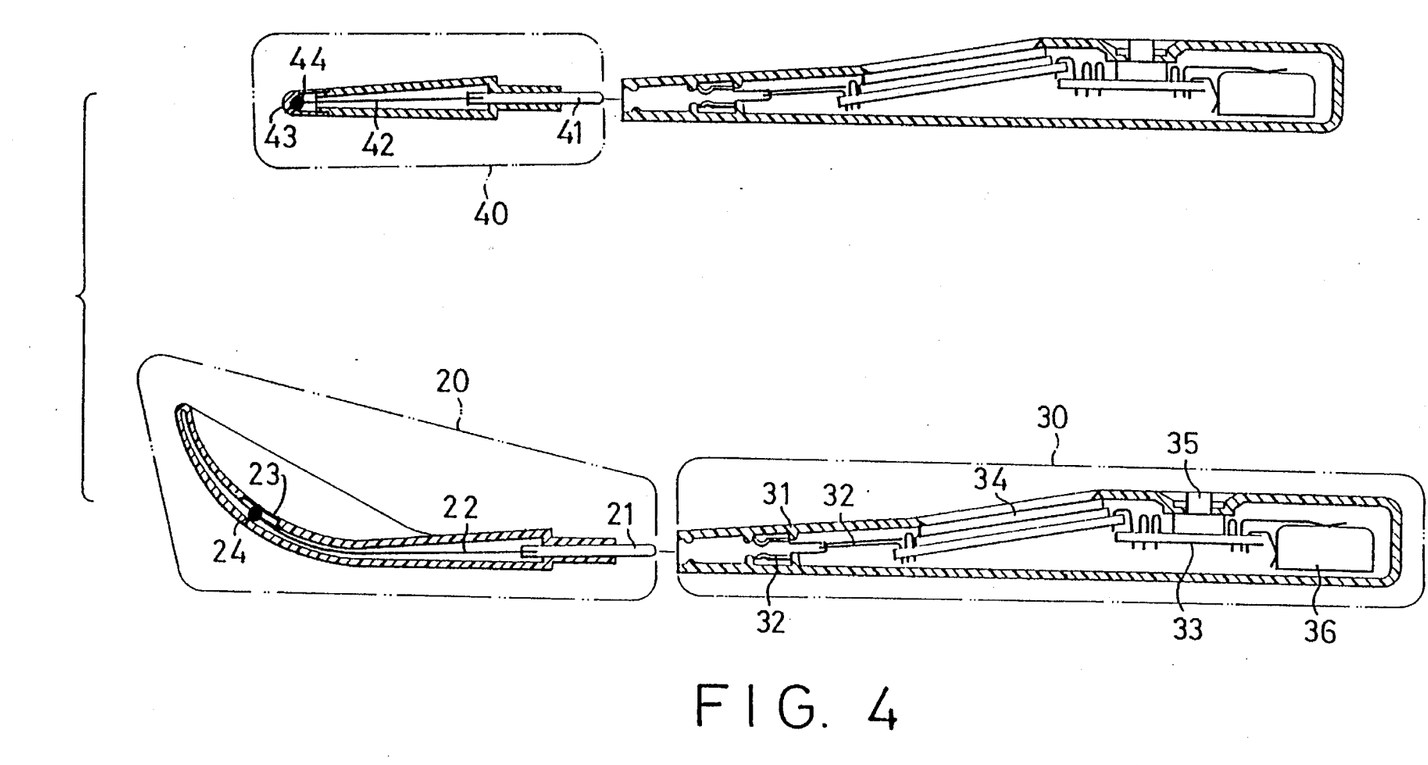
FIG. 4 is a sectional view of a multiusage thermometer shown in FIG. 3
Figure 5:
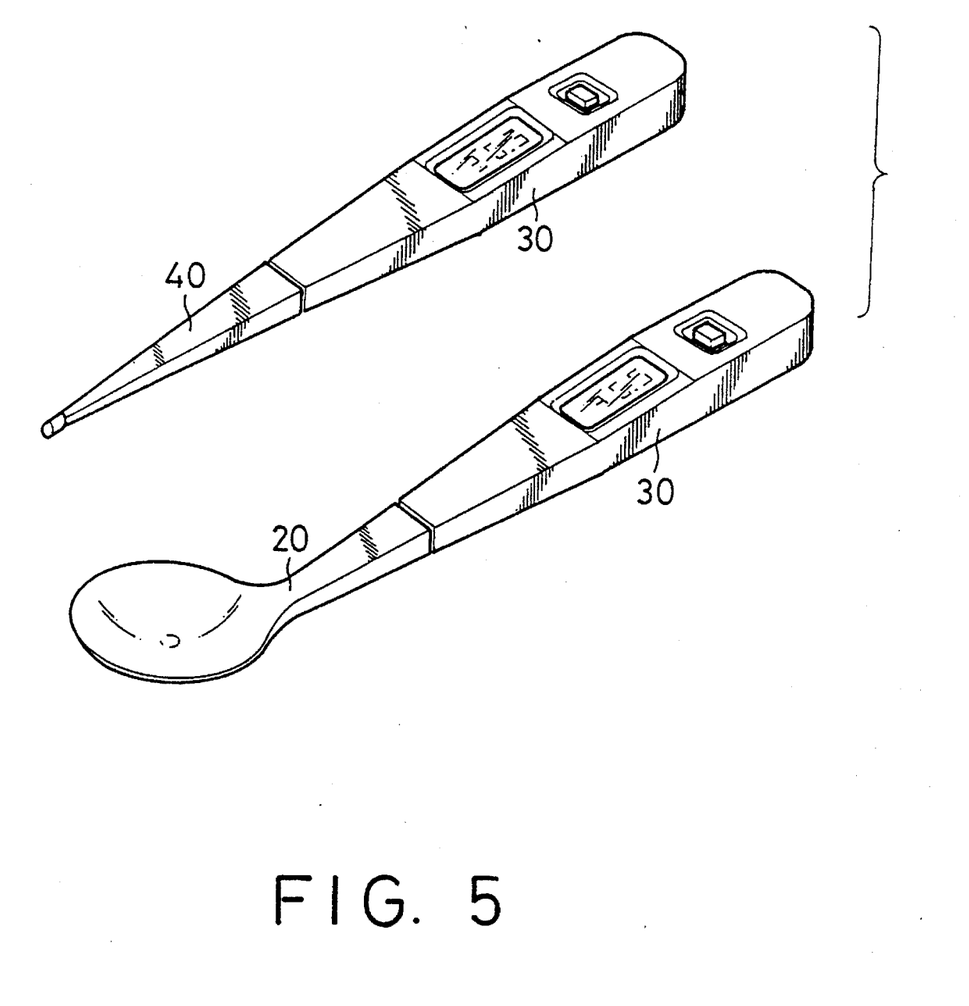
FIG. 5 is an assembled view of a multiusage thermometer shown in FIG. 3.

Referring to FIG. 4, the body portion 30 comprises a socket 31 at one end thereof allowing to receive the plug 21 (or 41) therein, thereby electrically engaging with the sensing portion 20 (or 40). A pair of transmitting wires 32 are electrically connected to the socket 31. A circuit board 33, a display screen 34, a power switch 35, and a battery 36 are installed inside the body portion 30. The tube structure sensing portion 40 comprises a first sensing cap 43 for sensing the temperature of an object contacted therewith, a first temperature sensing diode 44 connected with the sensing cap 43 for responding to the contacted object and generating a voltage drop thereacross, a pair of wires 42 connected with the first temperature sensing diode 44 for transmitting the voltage drop from the first temperature sensing diode 44 to the plug 41. The recurred voltage drop is then transmitted to the circuit board 33 via the socket 31 and the wires 32 and is processed by the circuit board 33, and thus a body temperature value is displayed on the display screen 34.

Similar to the tube structure sensing portion 40, the spoon structure sensing portion 20 comprises a second sensing cap 23 at the center of the spoon for transmitting the heat from the food contained in the spoon, a second temperature sensing diode 24 connected with the second sensing cap 23 for sensing the food temperature and incurring a voltage drop thereacross, a pair of wires 22 connected with the temperature sensing diode 24 for transmitting the voltage drop from the sensing diode 24 to the plug 21. The recurred voltage drop is then transmitted to the circuit board 33 via the socket 31 and the wires 32 and is processed by the circuit board 33, and thus the temperature value of the food is displayed on the display screen 34.

Figure 6:
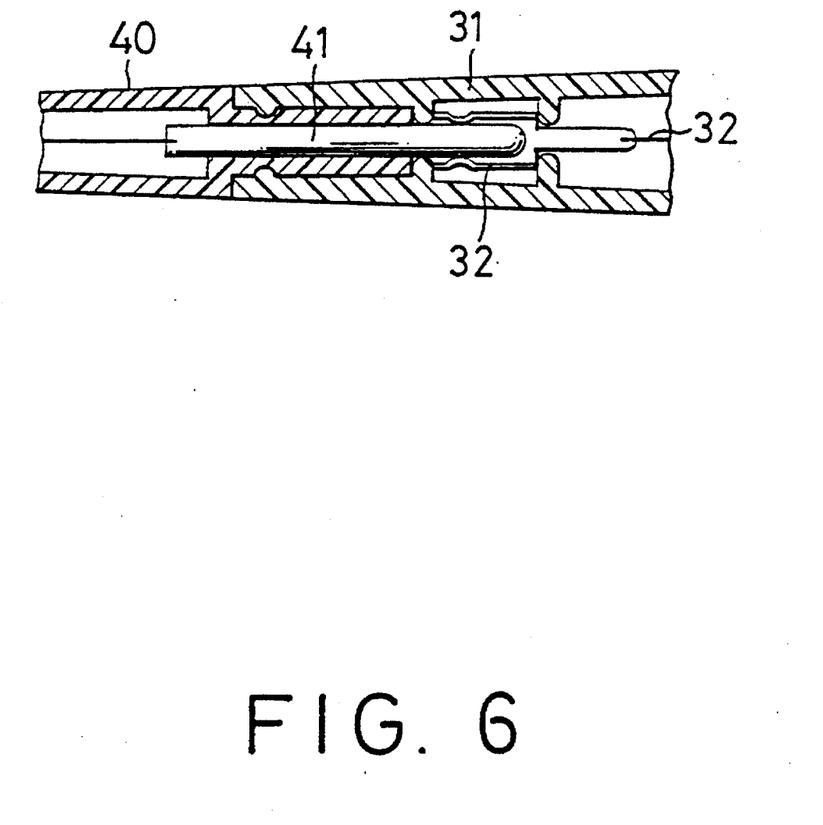
FIG. 6 is a partly sectional view illustrating the engagement between a sensing portion and a body portion of a multiusage thermometer shown in FIG. 3.

FIG. 6 illustrates the detailed engagement between the tube structure sensing portion 40 and the body portion 30, and the plug 41 is fixed in the socket 31 and electrically connected with the wires 32. The engagement between the spoon structure sensing portion 20 and the body portion 30 is exactly the same as that between the tube structure sensing portion 40 and the body portion 30.

Figure 7:
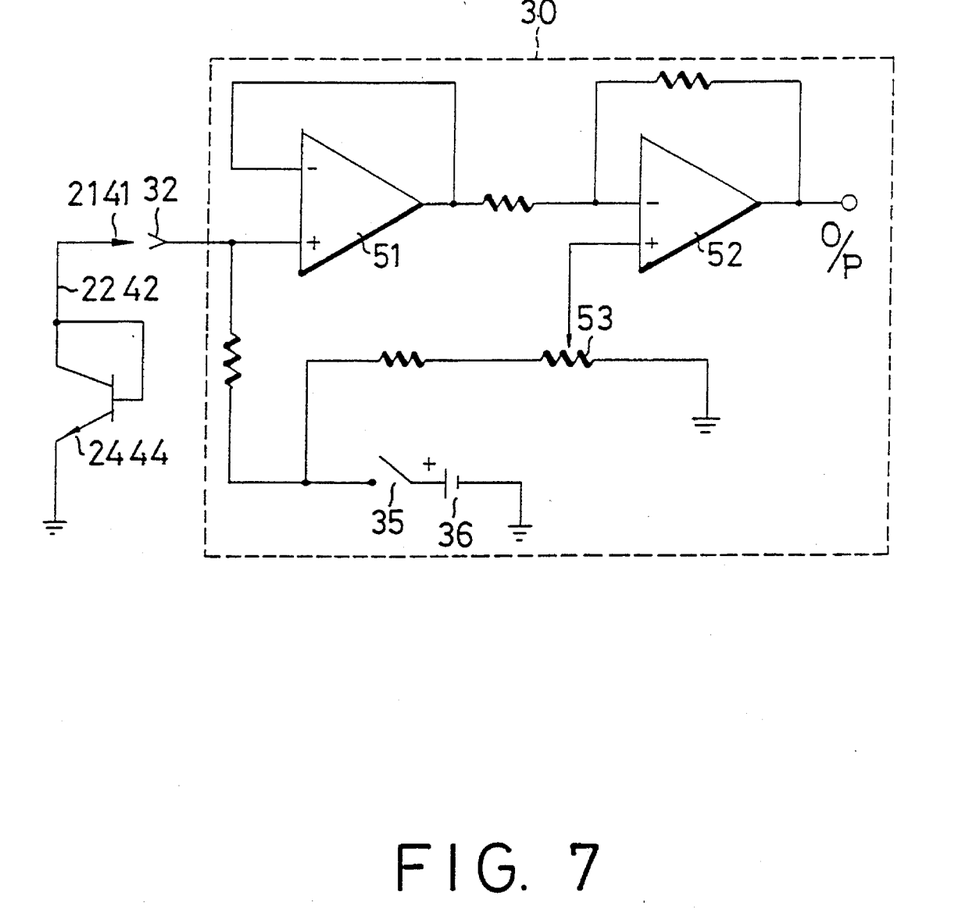
FIG. 7 is a circuit diagram for a multiusage thermometer according to the present invention.

Referring to FIG. 7, a temperature sensing circuit used in the present invention is illustrated therein. The temperature sensing diode 44 (or 24) for sensing the temperature of the measured object is basically a transistor, with the collector and the base thereof being electrically connected thus constituting a diode. A voltage drop across the base and the emitter is responsive to change according to the temperature change therearound. Therefore, the voltage drop is transmitted to the body portion 30 via the wire 42 (or 22) and the plug 41(or 21). The circuit in the body portion 30 comprises a first operational amplifier 51 and a second operational amplifier 52 connected in series (i.e., an output terminal of the first operational amplifier 51 is connected to an input terminal of the second operational amplifier 52). The first operational amplifier 51 functions as a voltage buffer and the second operational amplifier 52 functions as a signal amplifier. A variable resistor 53 is connected to a positive input terminal of the second operational amplifier 52 for rectifying the sensitivity of the output signal of the second operational amplifier 52 and providing an appropriate voltage compensation therefor. The battery 36 and the power switch 35 are also illustrated m the circuit for cooperating to provide the requisite power. The second operational amplifier 52 has an output terminal O/P connected to the display screen 34 (see FIG. 4). The second operational amplifier 52 outputs a signal representing the temperature of the measured object to drive the display screen 34 to display the temperature value.

Figure 8:
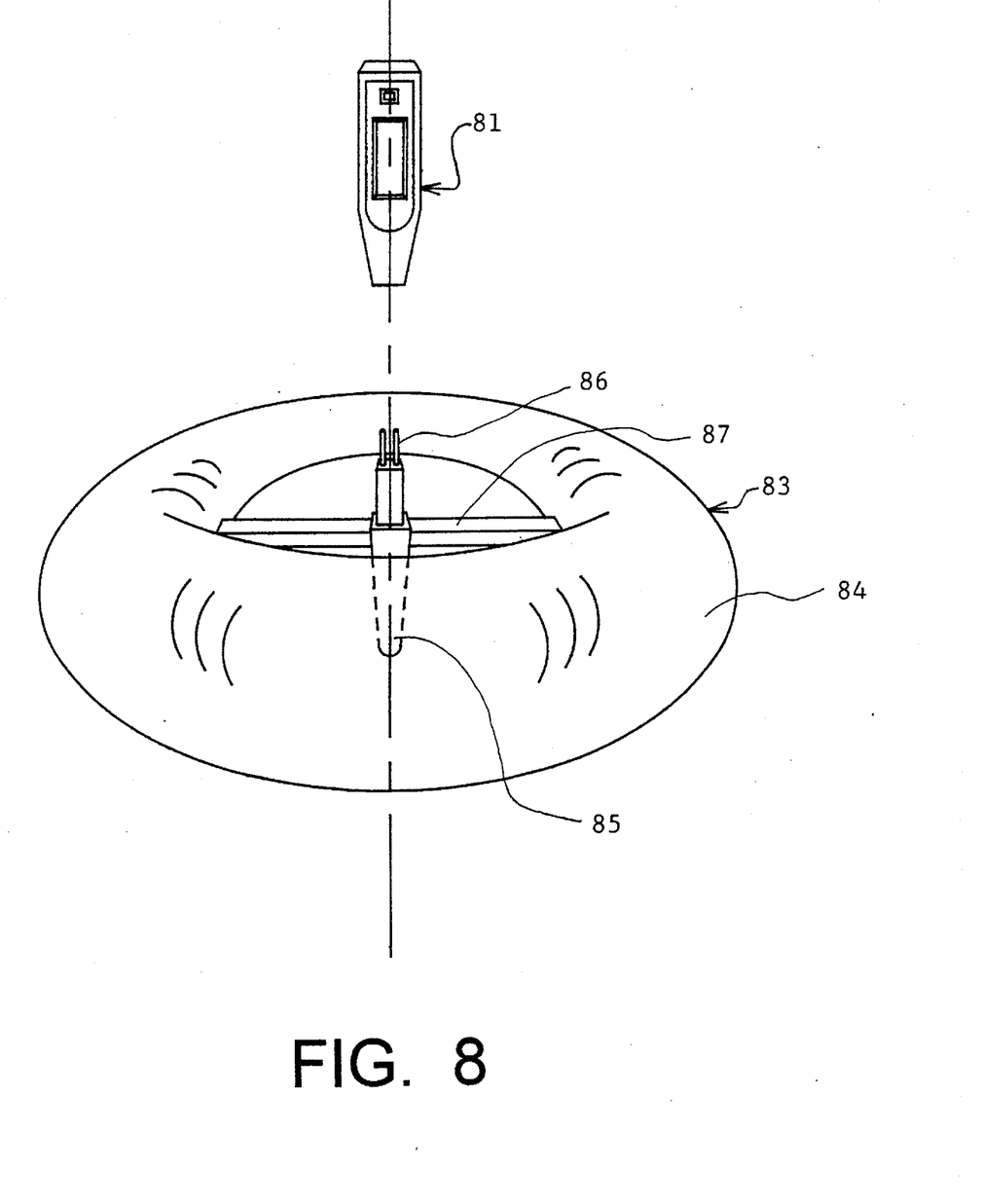
FIG. 8 is an exploded view of a multiusage thermometer in accordance with the present invention.

FIG. 8 shows a thermometer including a body portion 81 and a sensing portion 83 which includes a hollow annular structure 84, e.g. a swimming buoy structure, a sensing cap 85 having a plug 86 therewith, and a support frame 87 connected therebetween. This type of thermometer can be used for detecting a temperature of a hot water in a bath pool, for example. The sensing portion 83 is detached from the body portion 81 to serve as a tool for a child to play in the bath pool when the child's parent or a baby sitter is bathing the child. The sensing portion 83 is capable of being buoyant in water, and can attract the child to enjoy his/her bathing. Nevertheless, the safety of playing the sensing portion 83 in water is guaranteed because all the devices contained therein are passive devices which will not cause an electrical conduction to the child, parent, or baby sitter.

Figure 9:
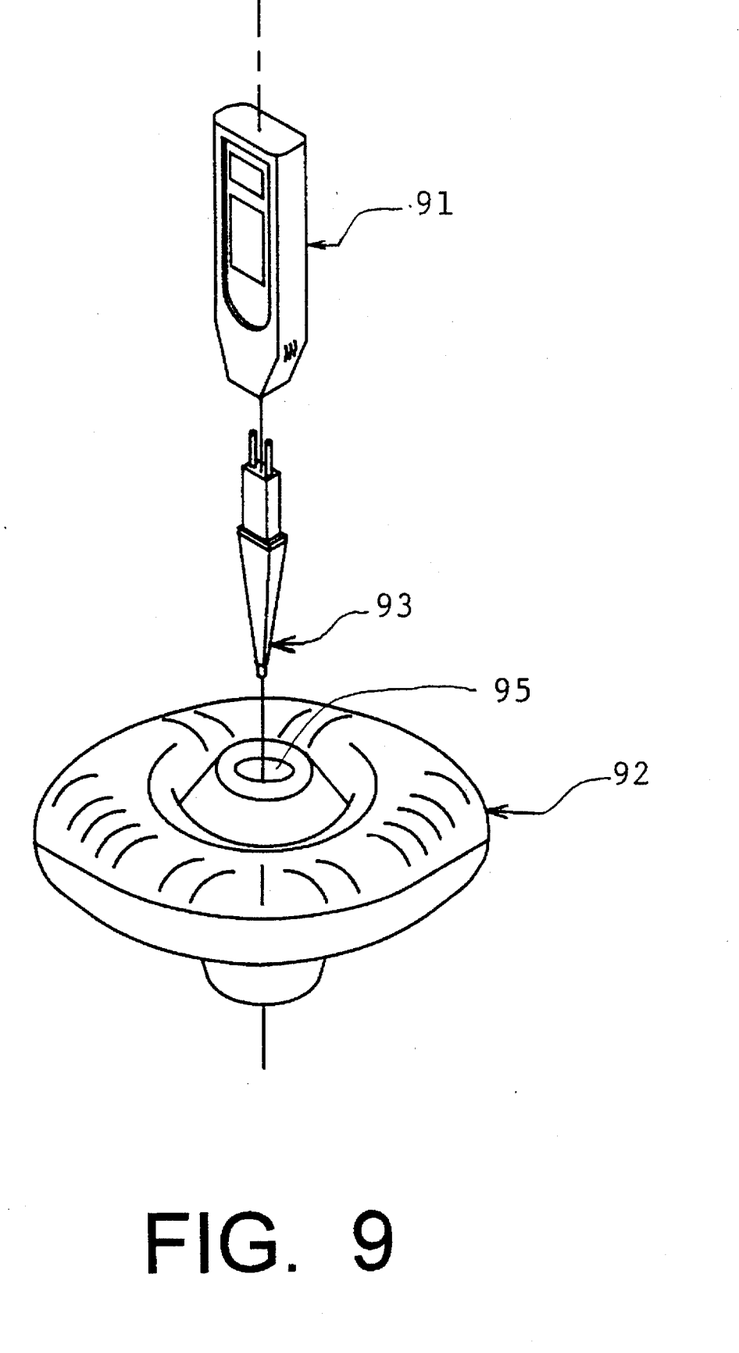
FIG. 9 is an exploded view of a multiusage thermometer in accordance with the present invention.
Figure 9A:
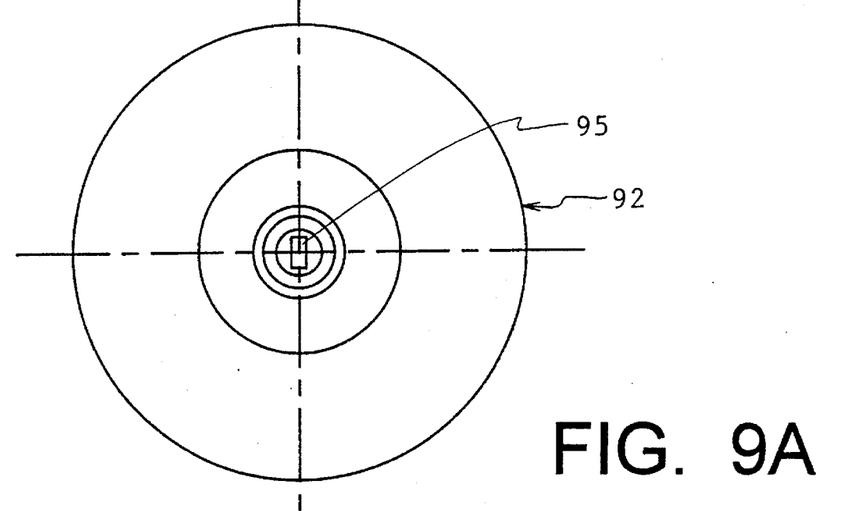
FIGS. 9A and 9B are respectively a top view and a bottom view of the multiusage thermometer shown in FIG. 9 in accordance with the present invention.
Figure 9B:
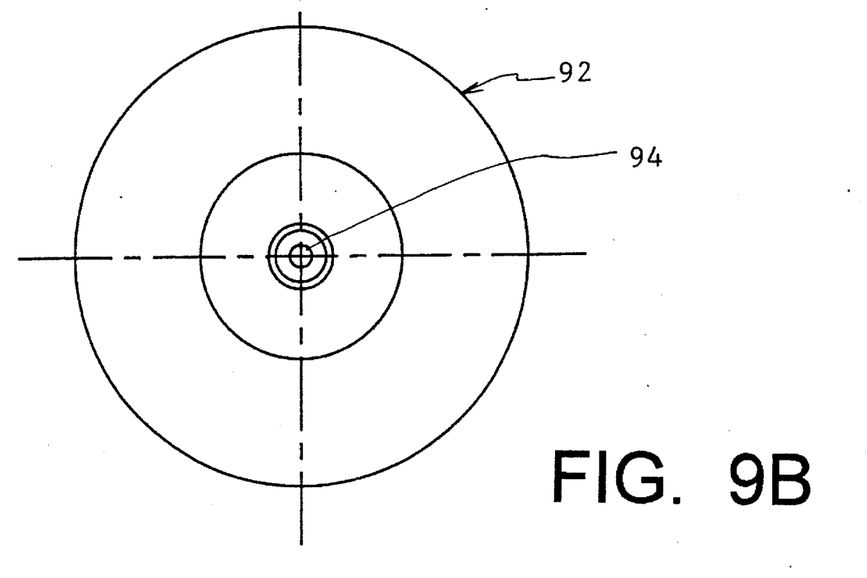

An alternative thermometer having a different structure of the sensing portion 92 for detecting a temperature of the hot water in a bath pool, as shown in FIG. 9, includes a body portion 91, a sensing portion 92 having a shape looking like a flying saucer, and a sensing cap 93 perpendicularly installed therethrough an interior room 95, as shown in FIG. 9A which shows a top view of the sensing portion 92, in the middle of the sensing portion. The sensing cap 93 can properly fit the dimensions of the interior room 95. There can be an opening 94, as shown in FIG. 9B which shows a bottom view of the sensing portion 92, on the bottom of the sensing portion for the sensing cap 93 being capable of directly contacting the water to be detected in order to get a much more precise temperature reading from the measured water. The sensing portion 92 can be detached from the body portion 91 and serve as a tool for a child to play.

Figure 10:
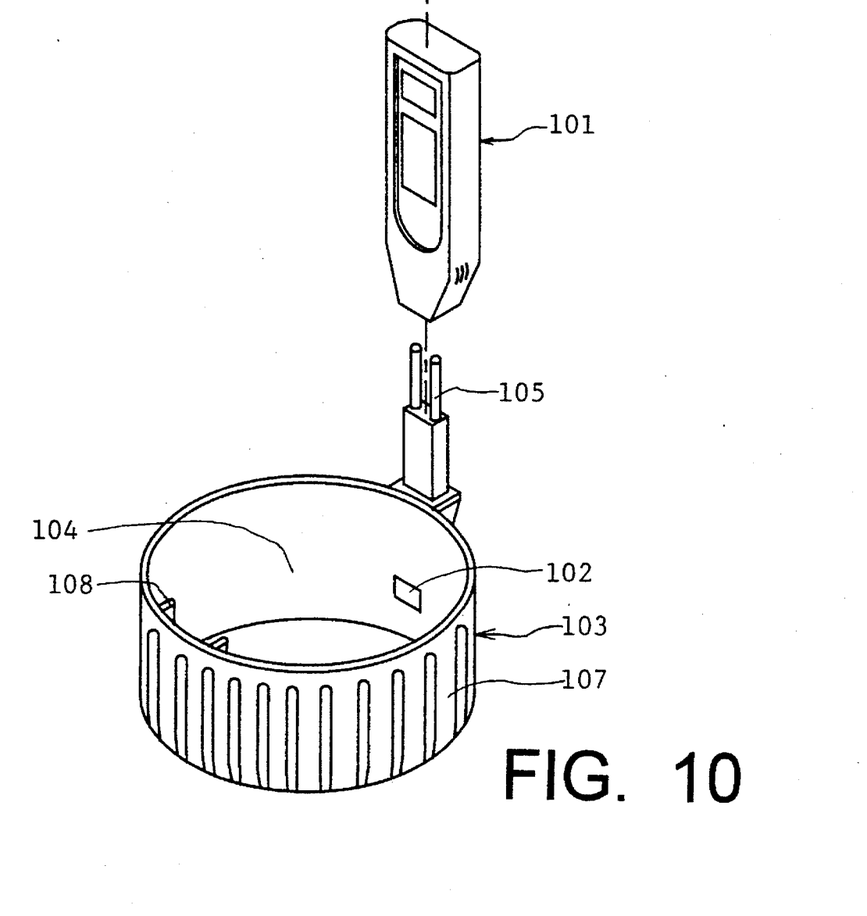
FIG. 10 is a perspective view of a multiusage thermometer in accordance with the present invention.
Figure 10A:
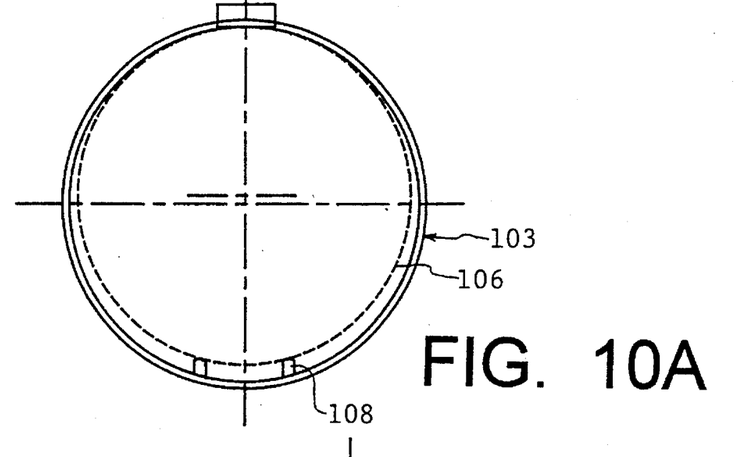
FIG. 10A is a top view of a multiusage thermometer shown in FIG. 10 in accordance with the present invention.

FIG. 10 illustrates another type of thermometer according to this invention. It includes a body portion 101, and a sensing portion 103 being a bottomed tube structure 103 having a sensing cap 102 therewith and having an interior 104 therein for accommodating a container such as a milk bottle 106, as shown in the region enclosed by the dashed circle in FIG. 10A which shows a top view of the sensing portion 103 accommodating the milk bottle 106 therein, to detect the temperature of the milk in the milk bottle 106. A plug 105 is internally formed on the edge of the bottomed tube structure 103. The bottomed tube structure 103 may be knurled or grooved on its outer surface 107 for easily handling. The bottomed tube structure 103 can further include thereon some protuberances 108 for securely urging the milk bottle 106 against the sensing cap 102 provided with the plug 105.

It is to be noticed that the operating principle or procedure of the embodiments in FIGS. 8, 9, or 10 is the same with that of the previous embodiments.

While the present invention has been explained in relation to its preferred embodiment, it is to be understood that various modifications thereof will be apparent to those skilled in the art upon reading this specification. For example, the engagement structure between the body portion and the sensing portion is not limited to the plug-socket combination as mentioned above. Actually, any inter-complementary structure which is able to electrically connect the body portion and the sensing portion together is suitable for the present invention. Therefore, it is to be understood that the invention disclosed herein is intended to cover all such modifications which will thus fall within the scope of the appended claims.

What is claimed is:

1. A multiusage thermometer comprising a body portion capable of selectively detachably engaging thereto at least a first sensing portion, a second sensing portion, a third sensing portion and a fourth sensing portion, each of said sensing portions having a first engaging member at a first end thereof, said body portion integrally forming a second engaging member at one end thereof for electrically and complementarily connecting thereto said first engaging member of each of said sensing portions, said fourth sensing portion having a generally bottomed tube structure having an interior therein for accommodating a container filled with contents, and having a sensing cap mounted on one side of said bottomed tube structure for contacting said container to obtain a temperature of said contents.

2. A multiusage thermometer as claimed in claim 1 wherein said first sensing portion has a tube structure having a sensing cap at a second end thereof for contacting with an object to thus obtain a temperature of said object which is displayed on said body portion.

3. A multiusage thermometer as claimed in claim 2 wherein said first sensing portion further comprises a temperature sensing diode electrically connected to said sensing cap for responding to said temperature of said object and incurring a voltage drop thereacross representing a relative temperature of said object.

4. A multiusage thermometer as claimed in claim 1 wherein said second sensing portion has a spoon structure having a spoon at a second end thereof, a sensing cap being installed at a center of said spoon for contacting with contents in said spoon to thus obtain a temperature of said contents which is displayed on said body portion.

5. A multiusage thermometer as claimed in claim 4 wherein said second sensing portion further comprises a temperature sensing diode electrically connected to said sensing cap for responding to contents in said spoon and incurring a voltage drop thereacross representing a relative temperature of said contents of said spoon.

6. A multiusage thermometer as claimed in claim 1 wherein said first engaging member is a plug and said second engaging member is a corresponding socket.

7. A multiusage thermometer as claimed in claim 1 wherein said third sensing portion has a generally hollow annular structure having a sensing cap generally positioned at a geometric center of said annular structure for contacting with an object to obtain a temperature of said object.

8. A multiusage thermometer as claimed in claim 1 wherein said third sensing portion is generally of a flying saucer structure having a sensing cap generally positioned at a geometric center of said saucer structure for contacting with an object to obtain a temperature of said object.

* * * * *